United States Patent [19]

Holman et al.

[11] Patent Number: 5,353,117
[45] Date of Patent: Oct. 4, 1994

[54] VERTICAL INTERVAL TEST SIGNAL FOR DETECTING VIDEO SYSTEM LOW-LEVEL LUMINANCE LINEARITY AND DIFFERENTIAL GAIN AND PHASE ERRORS

[75] Inventors: Tomlinson Holman, Culver City; David Schnuelle, Westlake Village, both of Calif.

[73] Assignee: LucasArts Entertainment Company, San Rafael, Calif.

[21] Appl. No.: 969,886

[22] Filed: Oct. 30, 1992

[51] Int. Cl.⁵ .............................................. H04N 17/00
[52] U.S. Cl. ...................................... 348/183; 348/180
[58] Field of Search ................. 358/10, 139, 21 V, 28, 358/147; H04N 17/00, 17/02, 9/68

[56] References Cited

U.S. PATENT DOCUMENTS

| | | | |
|---|---|---|---|
| 3,730,984 | 5/1973 | Smith | 358/10 |
| 3,972,065 | 6/1976 | Helges, Jr. et al. | 358/10 |
| 4,183,048 | 1/1980 | Isono et al. | 358/28 |
| 4,276,560 | 6/1981 | Watanabe et al. | 358/28 |
| 4,306,247 | 12/1981 | Tomimoto et al. | 358/28 |
| 4,344,084 | 8/1982 | Engel et al. | 358/21 V |
| 4,459,613 | 8/1984 | Faroudja | 358/167 |
| 4,706,108 | 11/1987 | Kumagai et al. | 358/10 |
| 4,876,596 | 10/1989 | Faroudja | 358/140 |
| 4,910,681 | 3/1990 | Ohtake et al. | 364/514 |

FOREIGN PATENT DOCUMENTS

| | | | |
|---|---|---|---|
| 0088491 | 4/1991 | Japan | H04N 7/130 |
| 0394956 | 1/1974 | U.S.S.R. | H04N 7/00 |

OTHER PUBLICATIONS

J. B. Watson, "Digital Automatic Measuring Equipment", Conference: International Broadcasting Convention, England, Sep. 1976.
R. P. Hubbard, "An Integrated T.V. Test Wave Generator", International Conference of T.V. Measurement, London, England, May 1979.
J. Golding, "TV Transmission Distortion, Automatic Correction," International Broadcasting Magazine pp. 18–25 (Apr. 1980).
EIA Television Systems Bulletin No. 1-EIA Recommended Practice of Use of a Vertical Interval Reference (VIR) Signal, Electrical Industries Association, Jul. 1972.
EIA Television Systems Bulletin No. 3-A History of the Vertical Interval Color Reference Signal (VIR), Electrical Industries Association, Mar. 1975.
Bruce Longfellow, "The New Remote Control VIT Signal", Broadcast Engineering 1971 pp. 20–25.
Shelley et al., "Automatic Measurement of Insertion Test Signals", The Radio and Electronic Engineer, Mar. 1971, pp. 137–143.
Benson, Television Engineering Handbook 1986, pp. 21.54–21.57.

*Primary Examiner*—Victor R. Kostak
*Assistant Examiner*—Nathan J. Flynn
*Attorney, Agent, or Firm*—Limbach & Limbach

[57] ABSTRACT

A test signal for enabling control of picture fidelity in a distribution system for distributing a video signal that has a vertical interval including a number of lines. The test signal comprises plural luminance levels for testing luminance linearity. The luminance levels have a nonlinear level relationship with respect to one another. Each luminance level has a predetermined level. The test signal may additionally include a chrominance component for testing differential gain and phase. The chrominance component has a predetermined amplitude and a predetermined phase corresponding to flesh tone. In a method of enabling control of picture fidelity in a distribution system for distributing a video signal, the above test signal is provided at a source stage and is inserted into at least part of a selected line in the vertical interval of the video signal. At a later stage in the distribution system, at least two of the luminance levels in the test signal in the vertical interval of the video signal are measured, each of the at least two measured luminance level are compared with its corresponding predetermined luminance level to provide at least two luminance errors, and luminance linearity in the source stage and/or the later stage is changed to correct the luminance errors. Chrominance gain and phase errors may also be determined, and differential gain and phase changed to correct the chrominance gain and phase errors.

34 Claims, 11 Drawing Sheets

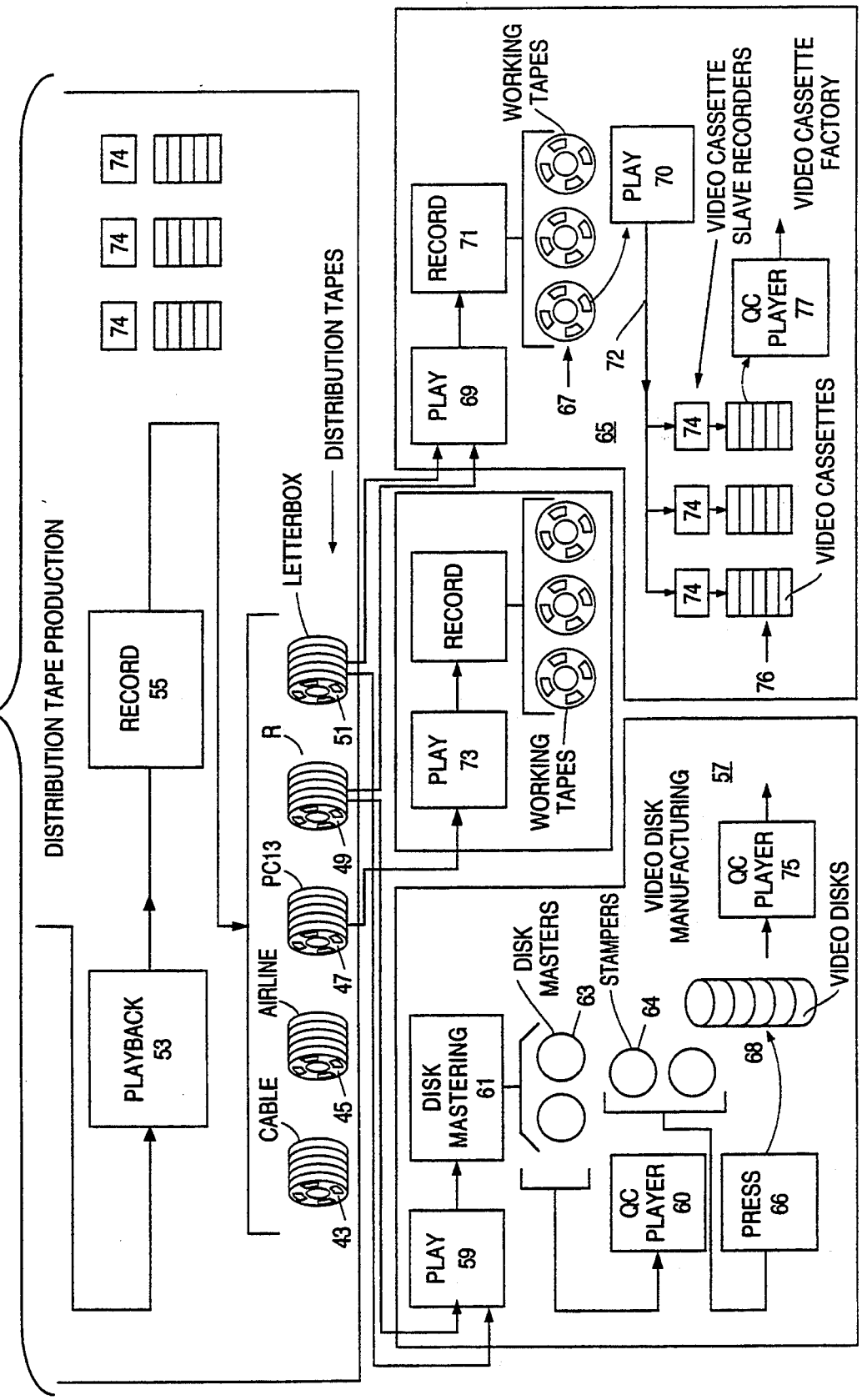

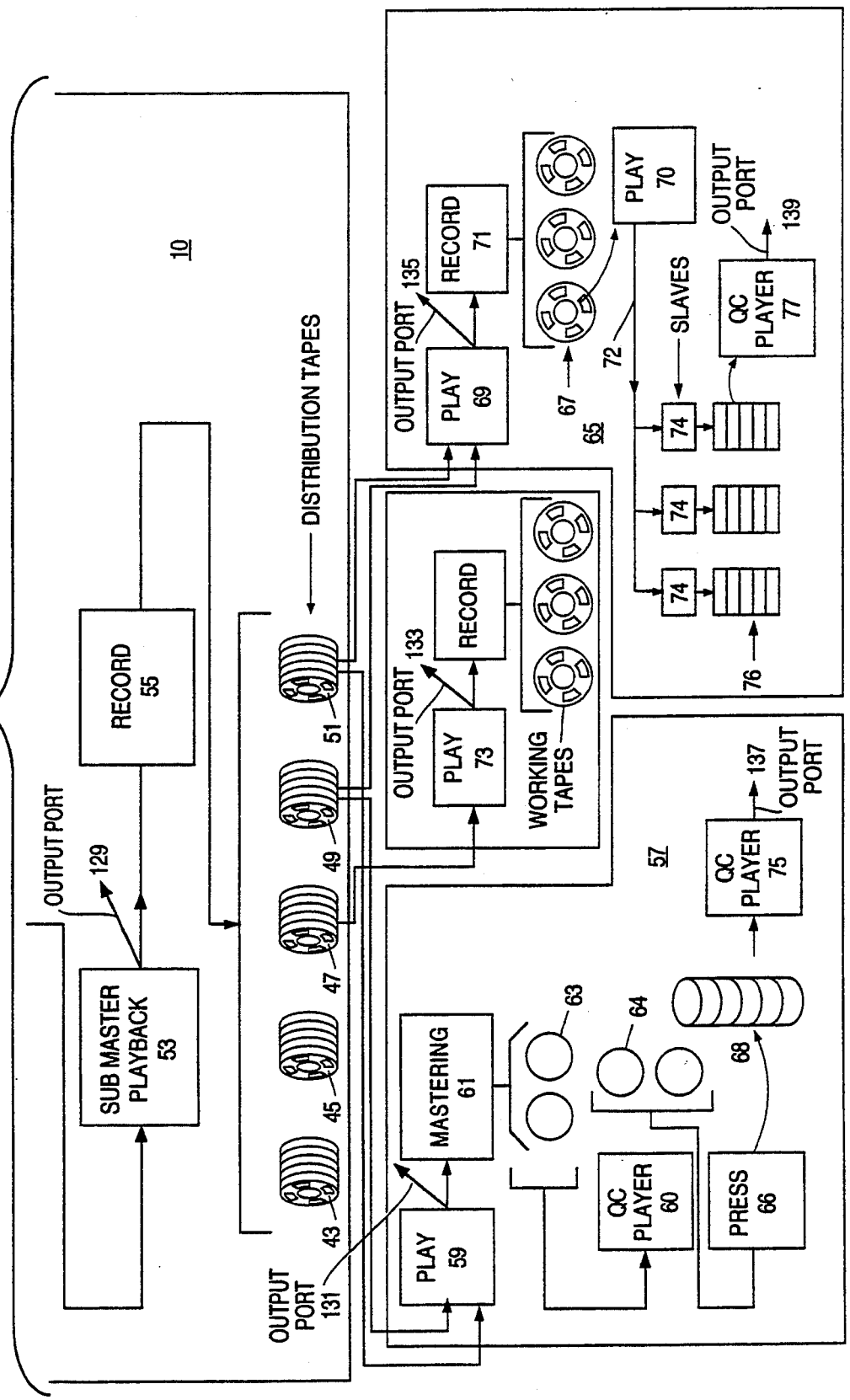

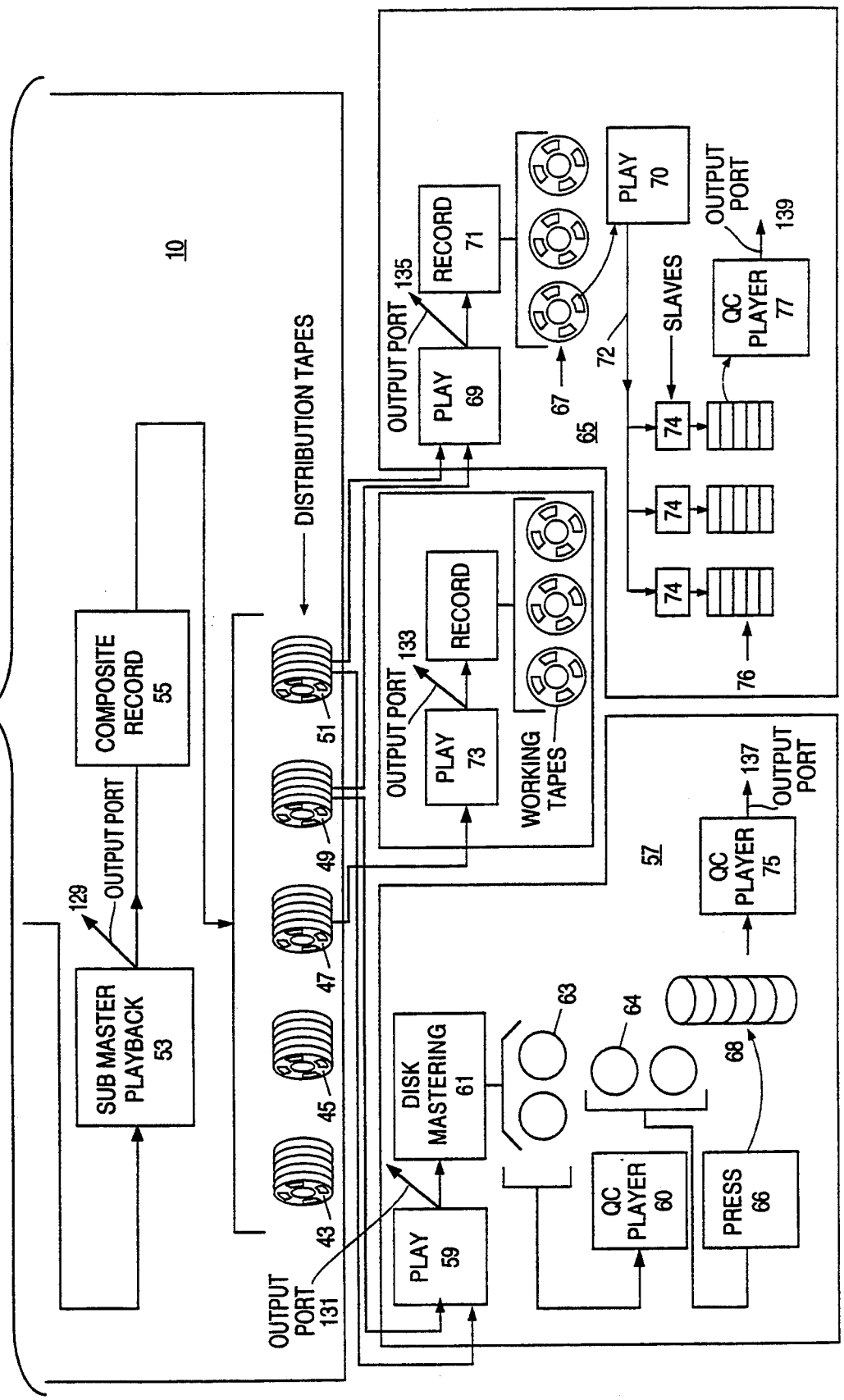

VERTICAL INTERVAL TEST SIGNAL FOR DETECTING VIDEO SYSTEM LOW-LEVEL LUMINANCE LINEARITY AND DIFFERENTIAL GAIN AND PHASE ERRORS

BACKGROUND OF THE INVENTION

The advent of video-based home theatre systems has led to an interest in improving the fidelity of the picture obtained from home video media such as video cassettes, video discs, and cable television. At a conference on home video attended by experts from the home video distribution arm of the film industry, a list of defects in the picture fidelity provided by home video was generated. The defects included, in approximate order of severity, reference black level, transient response, low frequency signal-to-noise ratio, luminance level, luminance linearity, hue, saturation, chrominance signal-to-noise ratio, and chrominance/luminance timing.

The process of distributing a motion picture film on home video media involves many production steps between the motion picture film and the home video medium. The defects in home video picture fidelity arise not only because of errors in reproducing the home video medium by the home video equipment, but also because of errors in the home video medium caused by errors in the production process steps between the motion picture film and the home video medium.

It has long been known to use a test signal in the vertical interval of a video signal to determine, and in some cases to correct, errors in the video signal. Such test signals are generally restricted to the distribution environment, but at least one of them, the VIR system, was intended to remain in the video signal distributed to the consumer (exclusively by broadcasters at that time), and to be used by circuitry in the consumer's television for controlling the picture.

The Vertical Interval Reference (VIR) system was introduced in the United States in the early 1970's by GTE as an attempt to correct some of the major chrominance errors that the NTSC system suffered from at the time. As the system was originally proposed, a VIR reference signal was to be added in the vertical interval by every source providing a video signal, and a circuit in the television receiver would adjust the picture in response to the VIR reference signal. The reference signal was to include a caucasian flesh-tone color reference signal on a 70 IRE unit pedestal, a luminance reference at 50 IRE units, and a black reference at 7.5 IRE units. In the version of the system adopted by the broadcasters, the color reference had the same phase as the color reference burst (green-yellow) "for ease of measurement," and the reference signal was added at "a point in the video system where both the correct amplitude and phase of the composite color signal are established and the artistic judgment is made that color reproduction is as desired." Further information on the VIR system, and the above quotations, can be found in A History of the Vertical Interval Color Reference Signal (VIR), EIA TELEVISION SYSTEMS BULLETIN NO. 3, (1975).

Although some broadcasters added the VIR reference signal, and television sets with the VIR circuit were sold, the VIR system as practically implemented did not deliver its intended improvements in picture fidelity. The efficacy of the VIR signal as a reference signal was undermined by the custom of stripping out and replacing the vertical interval at points in the broadcast chain. If the replacement vertical interval included a VIR reference signal at all, the replacement VIR reference signal bore little relationship to the VIR reference signal originally added at the point in the video system where the artistic judgment is made that the color reproduction is as desired. As a result, VIR circuity is no longer available in home video equipment.

Improved automatic picture control systems in consumer video equipment have achieved much of the same reduction in gross chrominance errors that the VIR system was intended to provide. Such automatic picture control systems control the picture by comparing the amplitude and phase of the color burst to an internal reference, and do not use an external picture-related reference.

Home theater systems have recently put new demands on consumer video picture fidelity. Home theatre systems are often viewed with low ambient light levels, as in the cinema. Such viewing conditions enable the video system to reproduce night scenes accurately. However, this also requires that the video system have good luminance linearity at low levels. Luminance linearity errors at low levels compress the grey scale, and make night scenes difficult, if not impossible, to discern.

Under these more critical viewing conditions, the results of chrominance differential gain and phase errors, which cause saturation and hue to change with the luminance level, become more apparent. Such errors are subjectively most noticeable on caucasian flesh tone. A differential phase error of 1 degree is just noticeable in caucasian flesh tones; a differential phase error of ±5 degrees represents a flesh tone change from pink to sallow.

Non-linear errors are particularly severe in video disc production, which can typically have a luminance non-linearity of about 10%, differential gain errors in the 12–15% range, and differential phase errors in the ±5–6 degree range.

Vertical interval test signals currently available for use in the home video distribution system are designed for convenience of performing measurements, and are insensitive to errors that cause subjectively-noticeable degradation in picture fidelity. For example, the FCC Composite test signal used internally by broadcasters and video production houses includes a luminance bar, 2 T and 20 T pulses, and a 5-step linear luminance staircase with chrominance modulation. This test signal enables errors in parameters such as video gain, low frequency response, sync level, high frequency response, and chrominance gain and delay to be measured and corrected.

The FCC Composite test signal also includes a staircase waveform with five equally-spaced steps for testing luminance linearity. Equally-spaced steps are easy to use for testing luminance linearity since they enable luminance linearity to be measured using an oscilloscope. However, this test signal and other test signals using equally-spaced luminance steps are unsatisfactory because it does not allow the linearity of the system at low luminance levels to be determined accurately.

The staircase waveform of the FCC Composite test signal also includes a chrominance component for determining differential gain and phase errors. This chrominance component has the same phase as the color reference burst, and represents a yellow-green color. This makes differential gain and phase errors easy to measure using a vector scope. However, this method of measuring differential gain and phase is unsatisfactory because the human eye is far less sensitive to differential gain and phase errors in green/yellow colors than it is to differential gain and phase errors in caucasian flesh tones.

As far as is known, none of the presently-used vertical interval test signals is intended to be included in the video signal on home video media for testing purposes in the distribution system, and for error correction purposes in home video equipment.

Systems for distributing motion picture films to the consumer on home video media such as video cassettes, video discs, and cable television are complex. A home video version of a given motion picture film can reach the consumer through the distribution system by one of several different routes. It is often difficult to determine the route by which an individual video cassette or video disc of a given motion picture has reached the consumer. If, for example, the video cassette or video disc is one that has been returned as defective, it is desirable to know the origin of the cassette or disc, so that the source of errors in the distribution system can be determined and remedied.

It is known to add an identification signal to a line in the vertical interval in broadcast television signals. The identification signal simply identifies the source of the signal, for example, the television station from which the signal originated. All signals originating at that source include the same identification signal. It would not be satisfactory to adopt this identification system in a video distribution system since the identification system would not enable the distribution process to be identified with sufficient accuracy.

OBJECTS AND SUMMARY OF THE INVENTION

It is an object of the present invention to provide a vertical interval test signal for use in a system for distributing motion pictures, and especially motion picture films, on video, and especially on home video media such as video cassettes and video discs.

It is a further object to provide a test signal that is psychometrically weighted to enable non-linear video errors to which the human eye is most sensitive to be detected and corrected.

It is a yet further object of the invention to provide a test signal that is added to a line in the vertical interval of the video signal at or near the point where the video signal is derived from the motion picture, and remains a part of the video signal throughout the distribution process as far as, and including, the video medium distributed to the end user, such as home video media distributed to the consumer.

It is a yet further object of the invention to provide a test signal that can be tested at each stage of the distribution process to determine the video fidelity of that stage. If measurements of the test signal are outside predetermined limits, the cause of the measurements being outside predetermined limits is determined and corrected, and that stage of the distribution process is repeated.

It is a yet further object of the invention to provide a test signal that can be tested at stages in the distribution system, including in the end user's video system, and any errors thus determined be used to control video processing circuitry to correct the detected errors.

It is an object of the invention to provide a vertical interval master identification signal for use in the system for distributing motion pictures, particularly motion picture films, on video, and especially on home video media such as video cassettes and video discs.

It is a further object of the invention to provide a master identification signal that is added to the video signal at or near the point at which the video signal is derived from the motion picture, and remains a part of the video signal throughout the distribution process as far as, and including, the video medium distributed to the end user, such as home video media distributed to consumers.

It is a yet further object of the invention to provide a master identification signal that uniquely identifies the master tape from which a video medium, such as a video cassette or a video disc, has been produced.

Accordingly, the invention provides a test signal for enabling control of picture fidelity in a distribution system for distributing a video signal that has a vertical interval including a number of lines. The test signal comprises plural luminance levels for testing luminance linearity. The luminance levels have a non-linear level relationship with respect to one another. Each luminance level has a predetermined level.

The test signal may additionally comprise a chrominance component for testing differential gain and phase. The chrominance component has a predetermined amplitude and a predetermined phase corresponding to flesh tone.

The invention additionally provides a method for enabling control of picture fidelity in a distribution system for distributing a video signal having a vertical interval including a number of lines, and a luminance component. The distribution system has a source stage and a later stage. At the source stage, a test signal is provided that includes plural luminance levels. The luminance levels have a nonlinear level relationship with respect to one another. Each luminance level has a predetermined level. The test signal is inserted into at least part of a selected line in the vertical interval of the video signal.

At the later stage, at least two of the luminance levels in the test signal in the vertical interval of the video signal are measured, each of the at least two measured luminance levels is compared with its corresponding predetermined luminance level to provide at least two luminance errors, and luminance linearity in the source stage and/or the later stage is changed to correct the luminance errors.

Each luminance level of the test signal may include a chrominance component. The chrominance component has a predetermined amplitude and a predetermined phase corresponding to flesh tone. At the later stage, with such a test signal, the amplitude and the phase of the chrominance component of at least two luminance levels are measured. Each measured amplitude and phase of the chrominance component is compared with the predetermined amplitude and the predetermined phase of the chrominance component to provide at least two chrominance gain errors and at least two chrominance phase errors. Finally, differential chrominance gain and differential chrominance phase in the source stage and/or the later stage are changed to correct the chrominance gain errors and the chrominance phase errors.

The testing and change process may be carried out using automatic circuitry, which may be located in the end user's video system.

In the distribution system, the video signal is processed to provide a processed video signal. Then, in the method according to the invention, at the later stage, at least two of the luminance levels in the test signal in the vertical interval of the processed video signal are measured. Each of the at least two measured luminance levels is compared with its corresponding predetermined luminance level to provide at least two luminance errors. Finally, processing the video signal is repeated when the luminance errors are outside a predetermined tolerance. The chrominance differential gain and phase may also be measured, and the processing step repeated if the differential gain and phase are outside a predetermined tolerance.

The processing step would normally be repeated only after the cause of the errors being outside a predetermined tolerance has been determined and corrected.

The invention also provides an apparatus for inserting a test signal into a video signal. The video signal has a vertical interval including a number of lines, and a luminance component. The apparatus comprises a device that receives the video signal; a device that generates a test signal including plural luminance levels; and a device that inserts the test signal into at least part of a selected line in the vertical interval of the video signal. The test signal includes plural luminance levels that have a non-linear relationship to one another. Each luminance level has a predetermined level.

The device that generates the test signal may also add a chrominance component to each luminance level. The chrominance component has predetermined amplitude and a predetermined phase corresponding to flesh tone.

The invention also provides an apparatus for correcting errors in a video signal. The video signal includes a test signal having plural luminance levels on at least part of a line in the vertical interval. The luminance levels have a non-linear level relationship with respect to one another. Each luminance level has a predetermined level. The apparatus comprises a device that measures at least two of the luminance levels in the test signal. The apparatus also includes a first comparing device that compares each of the at least two measured luminance level with its corresponding predetermined luminance level to provide at least two luminance errors. Finally, the apparatus includes a device, responsive to the luminance errors, that changes the luminance linearity of the video signal to correct the luminance errors.

If each luminance level of the test signal includes a chrominance component having a predetermined amplitude and a predetermined phase corresponding to flesh tone, the error correction apparatus may additionally comprise a device that measures the amplitude and the phase of the chrominance component of at least two luminance levels. The apparatus may also include a second comparing device that compares each measured amplitude and phase of the chrominance component with the predetermined amplitude and phase of the chrominance component to provide at least two chrominance gain errors and at least two chrominance phase errors. Finally, the apparatus may include a device, responsive to the chrominance gain errors and the chrominance phase errors, that changes the differential chrominance gain and the differential chrominance phase of the video signal to correct the chrominance gain errors and the chrominance phase errors.

The invention additionally provides a method for recording a video signal onto a video master. The method enables copies derived from the video master to be identified as being derived from the video master. According to the method, the video signal and a master identification number for uniquely identifying the video master are received. A video identification signal is generated in response to the master identification number and is inserted into the vertical interval of the video signal. Finally, the video signal, including the video identification signal, is recorded on the video master.

The invention also provides an apparatus for use in connection with recording a video signal onto a video master such that copies derived from the video master are identified as being derived from the video master. The apparatus comprises a device that receives the video signal, and a device that receives a master identification number uniquely identifying the video master. The apparatus also includes a device that generates a video identification signal in response to the master identification number and a device that inserts the video identification signal into the vertical interval of the video signal. Finally, the apparatus includes a device that provides the video signal, including the video identification signal, for recording on the video master.

BRIEF DESCRIPTION OF THE DRAWINGS

FIGS. 1(a) and 1(b) are a block diagrams showing a typical distribution system by which a motion picture film is distributed to the consumer in various home video media, such as video cassettes, video discs, cable television, airline movies, etc.

FIGS. 3(a) and 3(b) are a block diagrams showing how the test signal according to the invention is added to the component video output of the telecine machine, and tested at various points in the distribution system of FIG. 1.

FIGS. 5(a) and 5(b) are a block diagram showing how the test signal according to the invention is added to the composite video output of the NTSC encoder, and tested at various points in the distribution system of FIG. 1.

DETAILED DESCRIPTION OF THE INVENTION

Figure 1A:
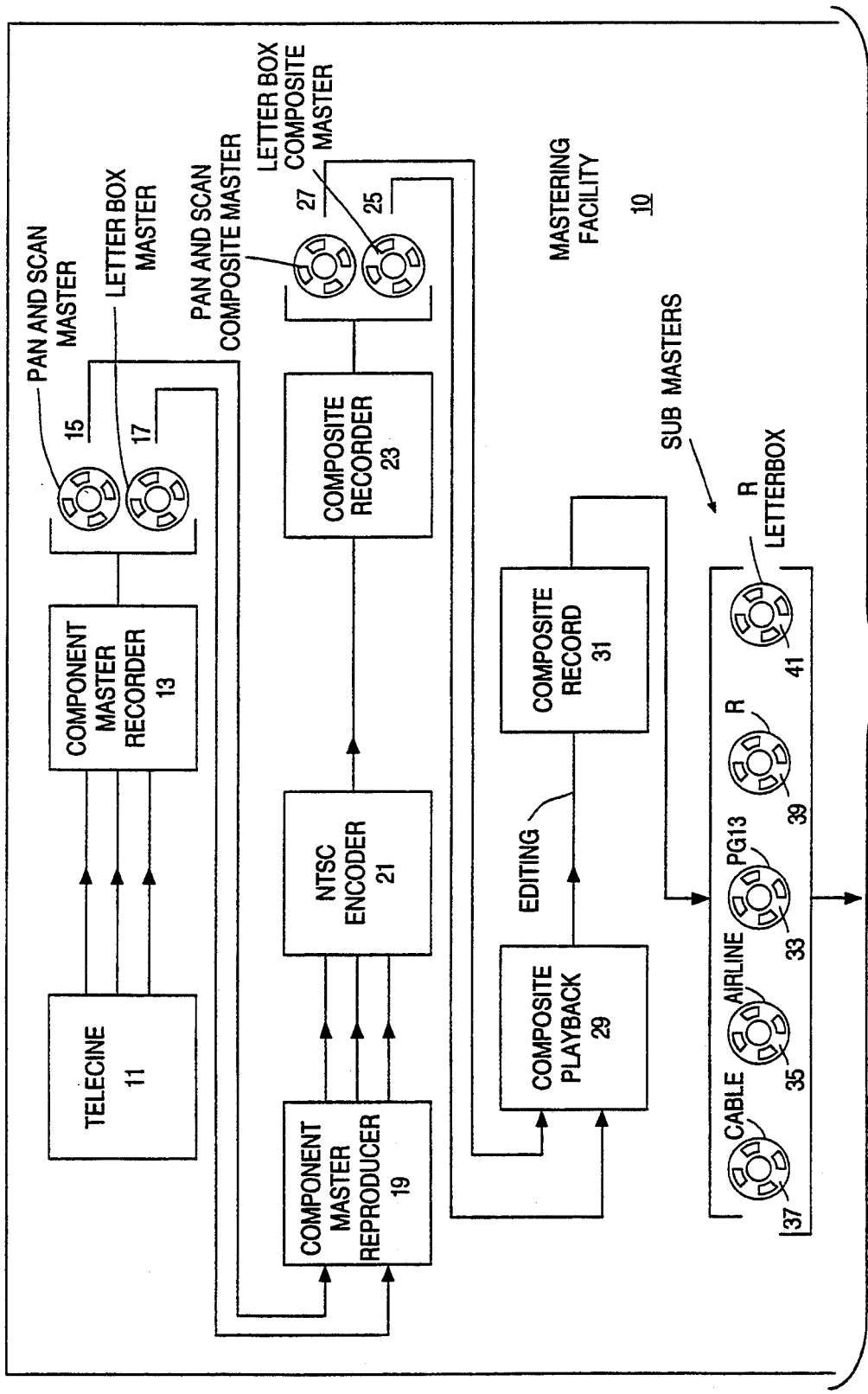

A typical distribution system by which a motion picture film is distributed to the consumer in various home video media, such as video cassettes, video discs, cable television, airline movies, etc. is shown in FIG. 1. In the following description, the term "consumer" will be taken to include other end users to which motion pictures are distributed in video form.

In FIG. 1, the first steps of the distribution system take place in the mastering facility 10. In the mastering facility, the motion picture film is reproduced on the telecine machine 11. The telecine machine produces a 3-component video signal that is recorded in component form on the component master recorder 13. This process is closely supervised to ensure that the video sound and picture are as close a match as possible to the sound and picture of the motion picture film. Any compromises are the subject of an artistic judgment.

If the motion picture film frame has an aspect ratio of greater than the 4:3 aspect ratio of the home video frame, a technique known as "pan and scan" is used to accommodate the necessary part of the film frame into the home video aspect ratio. Artistic judgments are made during this process. The master video tape 15 results from this transfer.

An additional transfer of the motion picture film to video may also be made without pan and scan. In this, the home video frame shows most or all of the wide aspect ratio film frame, with black bars at top and bottom. The master video tape 17 results from this additional transfer.

The master video tapes 15 and 17 are as accurate a copy of the motion picture film as can be reasonably achieved. The video signal is recorded in component form to ensure optimum video fidelity. Each of the master video tapes 15 and 17 are reproduced on the component master reproducer 19, which might be the same apparatus as the component master recorder 13. The resulting component video signal is fed into the NTSC encoder 21, which produces an NTSC standard composite video signal. The composite video signal is recorded on the composite video tape recorder 23. The video tapes produced from the pan-and-scan format master video tape 15, and the letterbox format master video tape 17 are indicated as 25 and 27, respectively.

The master video tapes 15 and 17 are put into storage, and are not normally used unless one of the video tapes 25 and 27 become worn or damaged.

Various editions of the video version of the motion picture film are produced by editing the video tapes 25 and 27. Editing is performed by copying from the relevant one of the video tapes 25 and 27 on video tape recorder 29 to the video tape recorder 31, where a sub-master tape is produced. For example, from an "R" rated original, a lightly edited "PG-13" rated version 33, a heavily edited "edited for airline use" version 35, and a version for showing on cable television 37 are produced. In addition, different versions of the "R" rated version for video cassette 39, with trailers and advertisements, and for video disc, with different trailers and advertisements, may be produced. For simplicity, only one letterbox format edition 41 is shown. In practice, different letterbox editions for video cassette, video disc, and, sometimes, cable, are produced.

From the sub-master tapes 33, 35, 37, 39, and 41, the mastering facility produces respective sets of distribution tapes 43, 45, 47, 49, and 51 for distribution to various manufacturing facilities. The distribution tapes are made by copying from the video tape recorder 53 to one or more video tape recorders 55.

From the mastering facility, the distribution tapes are sent to the various manufacturing facilities. For example, one of the letterbox-format tapes 51 is sent to the video disc manufacturing facility 57, where it is reproduced on the video tape recorder 59. The resulting video signal is fed into the video disc mastering unit 61 where disc masters 63 are cut. The disc masters 63 are checked on the master check machine 60. From the disc masters 63, the stampers 64 are made. The stampers 64 are fitted to a press 66 that is used for mass producing video discs 68. Production video discs are checked by playing them on the video disc player 75.

The mastering facility sends another of the letterbox-format distribution tapes 51 to the video cassette manufacturing facility 65. The video cassette manufacturing facility also receives one of the pan and scan format "R" rated distribution tapes 49. From these tapes, the manufacturing facility 65 makes a number of working tapes 67 by copying the appropriate one of the distribution tapes 49 and 51 from the video tape recorder 69 to the video tape recorder 71.

One of the working tapes 67 is shown being reproduced on the video tape recorder 70. The video output of the video tape recorder 70 is distributed via the video distribution network 72 to a bank of video cassette recorder slaves, three of which are indicated by the reference numeral 74. The video cassettes 76 recorded on the slaves are sold to the consumer. Production video cassettes are checked by playing them on the video cassette player 77.

Similar systems to that just described are used for distributing on video motion pictures other than motion picture films. The test signal, test apparatus, and test methods according to the invention can also be applied to such distribution systems.

In the distribution system just described, significant errors can accumulate on the tapes from which the home video media are produced because of the up to 5 stages of copying between the master video tapes 15 and 17 and these tapes.

The invention provides a test signal that is added to one line in the vertical interval of the video signal in the mastering facility 10 as early in the distribution system as possible. The test signal enables the video signal at each stage in the distribution system to be checked for errors that cause the most subjectively-noticeable degradation of picture fidelity. Equipment could also be added to the distribution system to correct any errors shown by the test signal to be present in the video signal.

Distribution tapes sent to the manufacturing facilities, such as the video disc manufacturing facility 57 and the video cassette manufacturing facility 65, include the test signal. The manufacturing facility copies the test signal to each home video medium it makes. The test signal enables the manufacturing facility to check the home video media it produces for errors that cause the most subjective degradations of picture fidelity.

Finally, since the test signal remains on the home video medium sold to the consumer, provision can be made in the consumer's video system for correcting the video signal reproduced from the home video medium for errors indicated by the test signal.

Figure 2A:
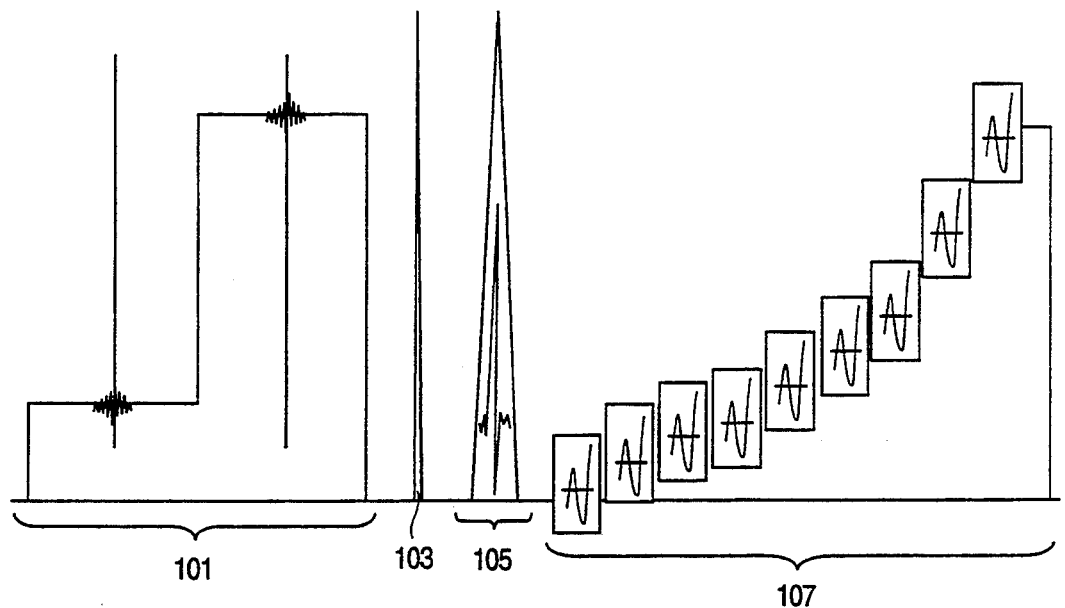
FIG. 2A shows the preferred form of a test signal according to the invention.

The preferred form of the test signal according to the invention is shown in FIG. 2A. The test signal includes a dual-polarity sin x/x section 101, with a duration of 11 microseconds ($\mu$s), a 2 T pulse 103, a modulated 20 T pulse 105, and a non-linear section 107, with a duration of 30 $\mu$s. The test signal preferably occupies the whole of a selected line, preferably line 19, in both fields of the NTSC frame.

The sin x/x section 101 enables frequency response and group delay to be tested. Low group delay is desirable to maintain symmetrical edges around sharp objects. The 2 T pulse 103, a $\sin^2$ pulse having a half amplitude duration of 2 T, enables transient response to be tested. The modulated 20 T pulse 105, a $\sin^2$ pulse having a half amplitude duration of 20 T and modulated with a chrominance signal, enables chrominance level and chrominance delay, relative to the luminance, to be tested. Chrominance level relative to luminance determines color saturation. A low chrominance delay is desirable to maintain sharp edges on color transitions, and to avoid color smearing. Further information on testing using T-pulses can be found in Harold Ennes, Using the $\sin^2$ Window, BROADCAST ENGINEERING, page 38-47, (April 1975).

Figure 2B:
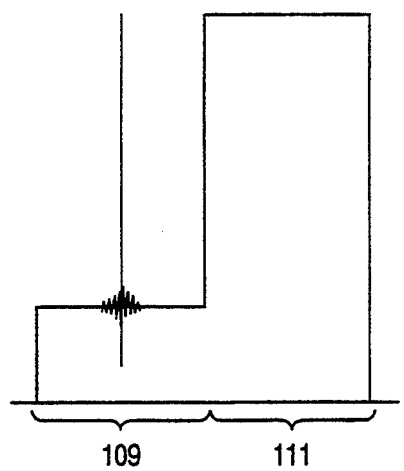
FIG. 2B shows the an alternative form of part of the test signal according to the invention.

The dual-polarity sin x/x section 101 may be replaced by the alternative sin x/x arrangement of a single polarity sin x/x section 109 with a pedestal level of 20 IRE units, and a luminance bar 11 with a level of 100 IRE units, as shown in FIG. 2B. The sin x/x section and the luminance bar each have a duration of 5.5 µs.

The non-linear section 107 enables luminance non-linearity, especially at low levels, and chrominance differential gain and phase to be tested. The non-linear section 107 preferably consists of a non-linear 10-step luminance staircase modulated with a chrominance component having an amplitude and phase that corresponds to a typical caucasian flesh tone.

Preferably, the luminance staircase has luminance levels of 7.5, 10, 12.5, 20, 30, 50, 70, 80, 90, and 100 IRE units. Each luminance level has a duration of 3 µs. One IRE (for Institute of Radio Engineers) unit is 1/140 of the peak-to-peak amplitude of a composite video signal. The composite video signal consists of 100 IRE units of video and 40 IRE units of sync.

Each luminance level is modulated with 40 IRE units ($\pm 20$ IRE units with respect to the nominal luminance level) of chrominance signal having a phase of 300 degrees with respect to the color reference burst. A chrominance signal with this amplitude and phase corresponds to a typical caucasian flesh tone.

Although a staircase waveform is preferred, there is no requirement for the luminance levels to be in order of increasing level. The luminance levels may be in order of decreasing level; alternatively, high level and low level steps may be juxtaposed to provide additional opportunities for testing transient performance.

The non-linear section of the test signal according to the invention differs from known waveforms for testing luminance linearity in that it provides luminance levels having a non-linear level relationship with respect to one another. The luminance levels in the test signal are concentrated at luminance levels at which luminance linearity errors are subjectively most noticeable. Thus, three closely-spaced luminance levels are provided at low luminance levels, in the vicinity of a luminance level of 10 IRE units, which correspond to the luminance level of most night scenes in motion picture films. Luminance levels are widely spaced at middle luminance levels, for example, between about 30 IRE units and about 70 IRE units, because luminance non-linearity is less likely to occur at such levels. In the preferred embodiment, luminance levels are spaced at 20 IRE unit intervals at middle luminance levels. Luminance levels provided at more narrowly spaced intervals at high luminance levels, for example, above about 70 IRE units, to detect luminance saturation effects. In the preferred embodiment, luminance levels are spaced at 10 IRE unit intervals at 70 IRE units and above.

Luminance linearity testing has traditionally involved displaying a luminance staircase waveform on an oscilloscope, and determining whether or not the steps of the staircase waveform lie on the graticules of the oscilloscope screen. The non-linear section of the test signal according to the invention does not lend itself to this type of testing. The availability of digital test sets with the capability of measuring the level and phase at any predetermined point of a waveform, as will be described below, makes it practical to test luminance linearity using a staircase waveform with non-linear steps.

Traditional testing of chrominance differential gain and phase has traditionally modulated a linear staircase waveform with a chrominance signal having the same phase as the color reference burst. This makes it easy to measure phase errors using a vector scope, but the phase of the chrominance signal corresponds to a green-yellow hue, at which the eye is relatively insensitive to color errors. The chrominance signal in the non-linear part of the test signal according to the invention has a phase corresponding to typical caucasian flesh tone. This makes the task of measuring the differential phase error more difficult, but enables differential gain and phase errors to be determined at a hue at which the eye is subjectively more sensitive to differential gain and phase errors. Again, as will be described in more detail below, a digital test set makes it feasible to test differential gain and phase using a chrominance signal that has a phase different from the color reference burst.

Figure 3A:
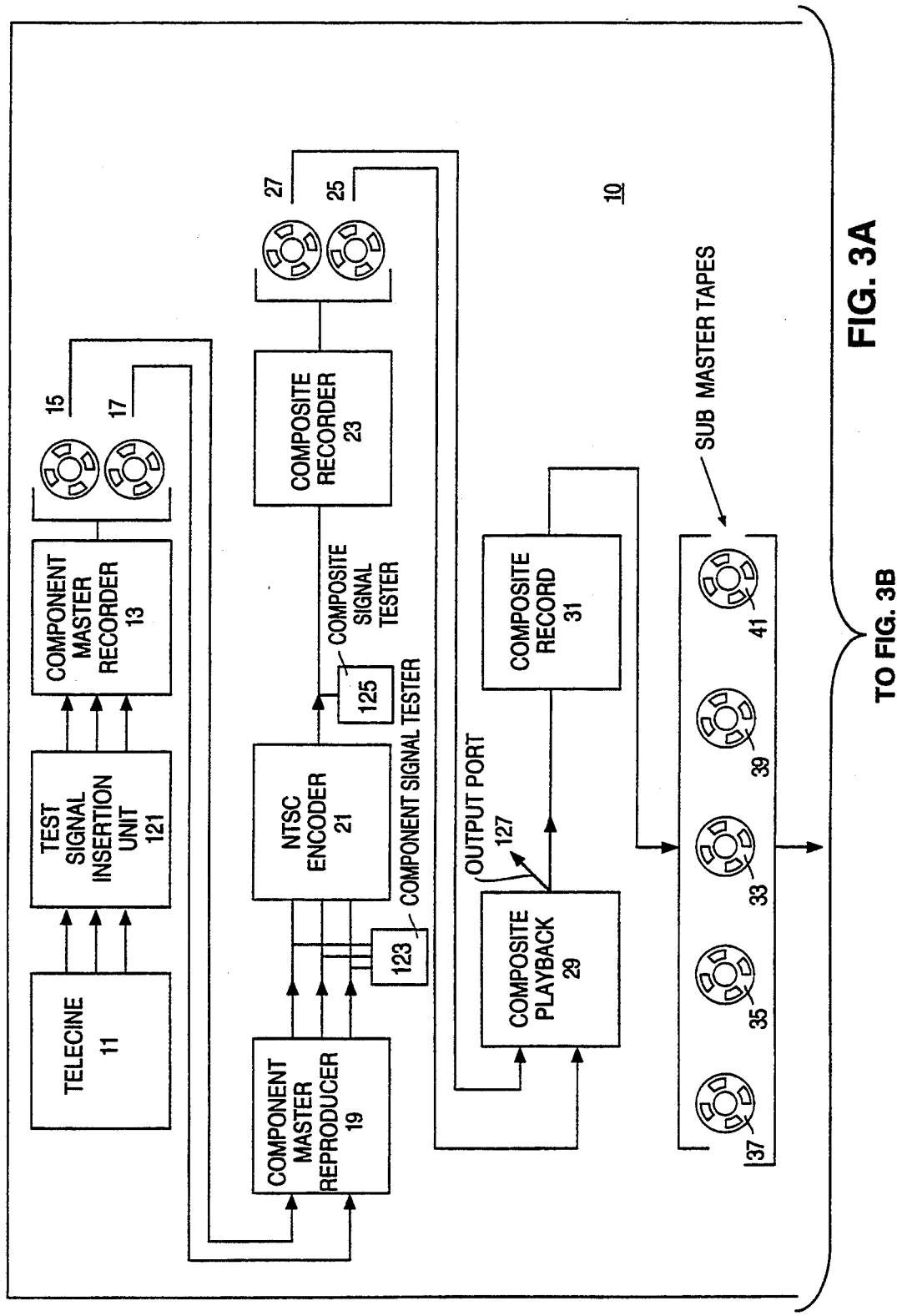

FIG. 3 shows how the test signal according to the invention is used in the mastering system of FIG. 1. In FIG. 3, the test signal is added to the video signal at the earliest possible stage of the mastering system, i.e., to the component video signal produced by the telecine machine 11. The component video signal from the output of the telecine machine 11 is connected to the input of the component test signal insertion unit 121, and the component video signal from the output of the component test signal insertion unit is connected to the input of the component video recorder 13. Adding the test signal to the output of the telecine machine 11 enables the test signal to be included in the component video signal recorded on the master video tapes 15 and 17. The component test signal insertion unit 121 will be described below in connection with FIG. 4.

The test signal in the component video signal produced by the component master reproducer 19 may be tested by feeding the component video output signal from an output port on the component master reproducer into the component test signal tester 123. Testing the test signal in the component video signals produced by the component master reproducer 19 enables any defects in the component master reproducer to be identified. The defective apparatus can then be repaired, adjusted, or replaced, and the production step repeated. This prevents master video tapes on which a defective video signal is recorded from being passed to the next stage (and hence to subsequent stages) of the distribution process.

The test signal in the composite video output of the NTSC encoder may be tested by feeding the composite video signal from a port on the NTSC encoder into the composite test signal tester 125. Testing the test signal in the composite video signal produced by the NTSC encoder enables any defects in the NTSC encoder to be identified. The defective apparatus can then be repaired or replaced, and the production step repeated. This prevents tapes on which a defective video signal is recorded from being passed to the next stage (and hence to subsequent stages) of the distribution process.

Figure 5A:
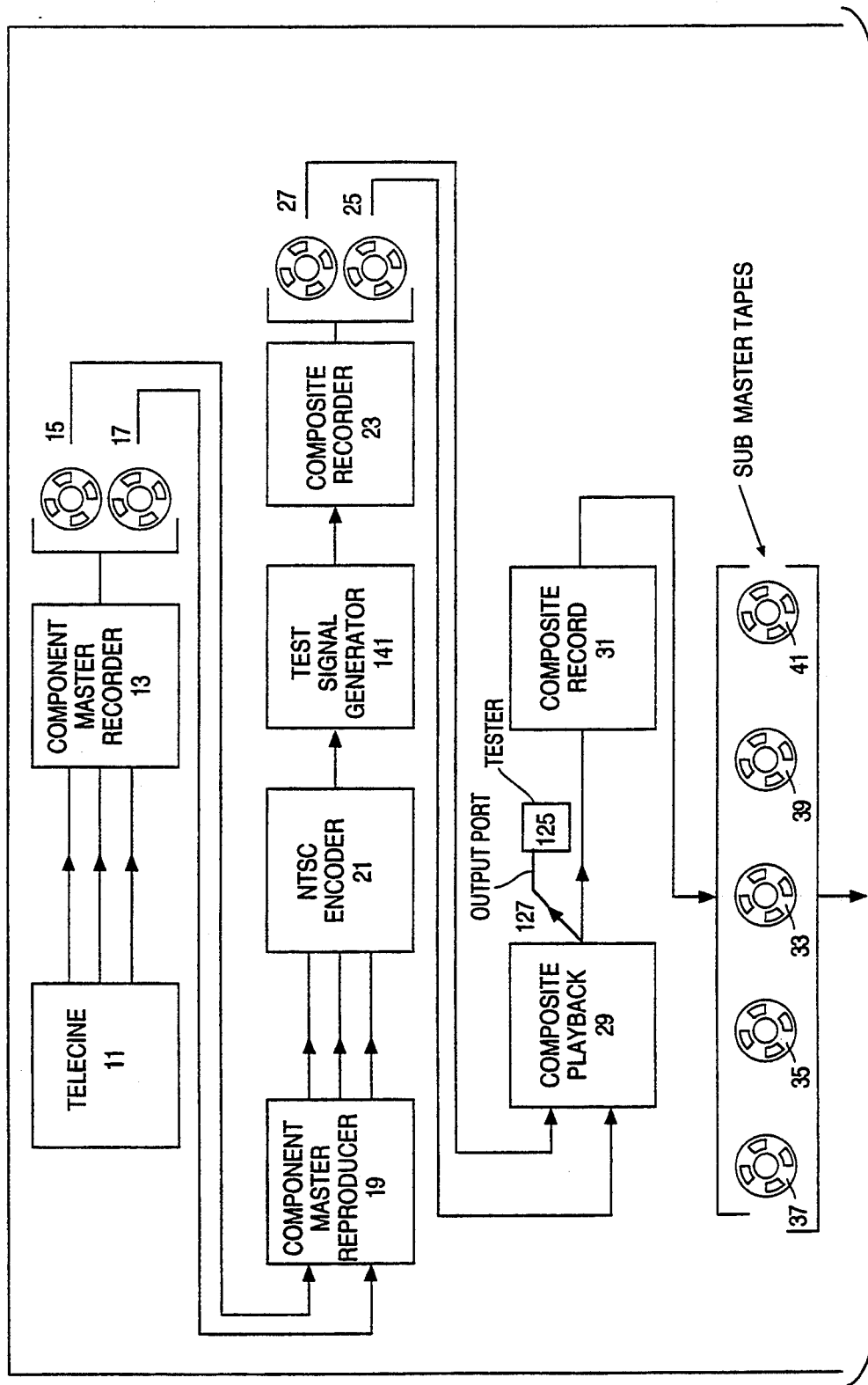

The analog video output of each composite video playback machine, e.g., 29, 53, 59, 69, 73, 75, and 77 in the distribution system is fed to an output port, e.g., 127, 129, 131, 133, 135, 137, and 139, to which a composite test signal tester, e.g., the tester 125, can be connected, as will be described below in connection with FIG. 5. Alternatively, a composite test signal tester can be left connected to the port on each playback machine. Ports for connecting a composite test signal tester can also be provided at other points in the distribution system, if desired. The test signal can be tested at any point in the distribution system where the video signal is processed, by reproducing, recording, copying, transmitting, receiving, etc.

Figure 4:
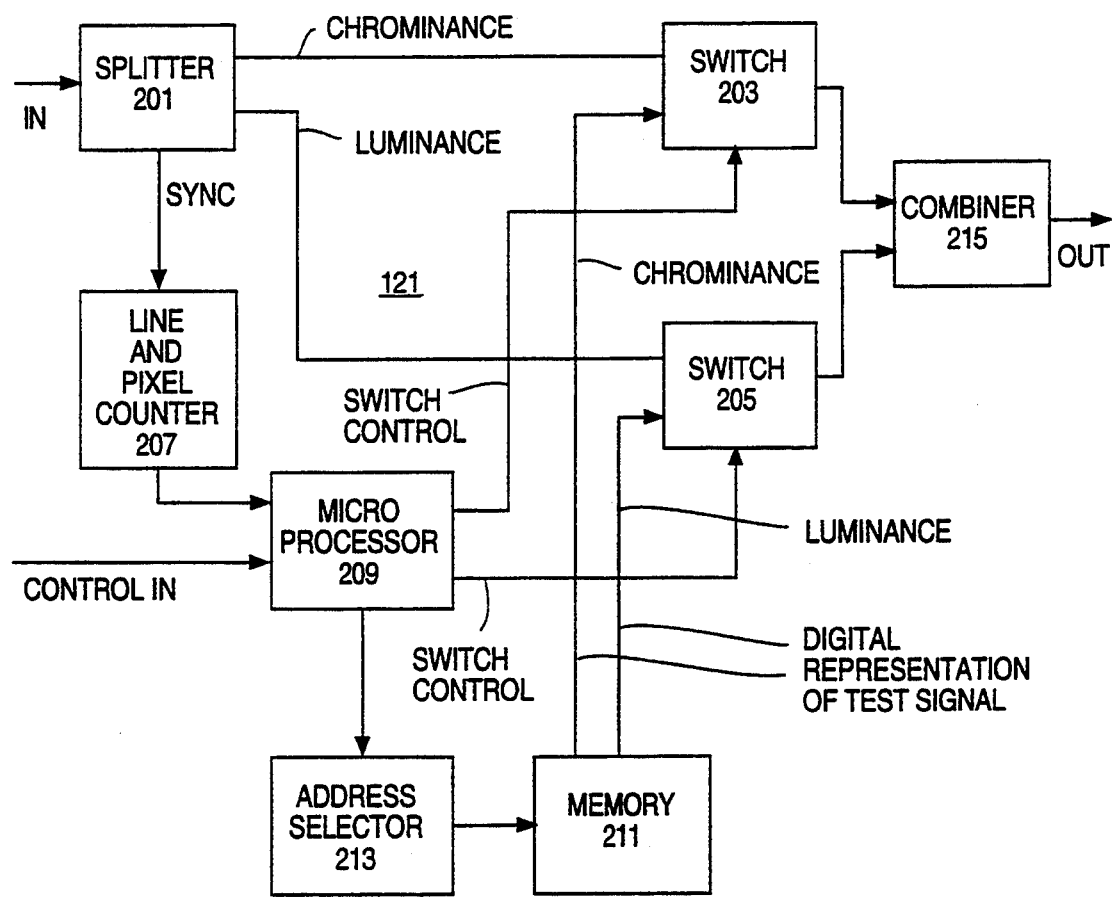
FIG. 4 is a block diagram of a component test signal insertion unit for inserting a test signal according to the invention into the component output signal of the telecine machine.

The component test signal inserter 121 will now be described with reference to FIG. 4. In FIG. 4, the digital component video signal in the D1 digital format from the telecine machine 11 (FIG. 1) is fed into the splitter 201 where the digital video signal is divided into chrominance data and luminance data, which pass into switches 203 and 205, respectively. The splitter 201 also extracts the sync component of the digital video signal, and passes it to the line and pixel counter 207. The output of the line and pixel counter 207 is fed into the microprocessor 209, which also receives control data for use in connection with the source identification aspect of the invention to be described below. Digital representations in D1-digital video format of the luminance and chrominance components of the test signal are stored in the memory 211. Data is read out of the memory under control of the microprocessor 209 via the address selector 213.

Switches 203 and 205 normally connect the luminance and chrominance data from the splitter 201 to the combiner 215, which recombines the luminance and chrominance data to provide a D1 format digital video signal. In response to the line and pixel counter, the microprocessor determines when the luminance data for the selected line, such as line 19, is presented to the switch 205, and changes the state of the switch 205 so that the memory 211 is connected to the combiner 215. The microprocessor also causes the address selector 213 to read the luminance component of the test signal in D1 digital video format from the memory 211. The luminance component passes via the switch 205 into the combiner 215. The luminance component of the test signal, read out from the memory 211, replaces any luminance data on the selected line that formerly was part of the input video signal. At the end of the luminance data for the selected line, the microprocessor 209 restores the switch 205 to its normal state, and reconnects the input of the combiner 215 to the output of the splitter 201.

In response to the line and pixel counter, the microprocessor 209 determines when the chrominance data for the selected line is presented to the switch 203, and changes the state of the switch 203 so that the memory 211 is connected to the combiner 215. The microprocessor also causes the address selector 213 to read the chrominance components of the test signal in the D1 digital video format from the memory 211. The chrominance components pass via the switch 203 into the combiner 215. The chrominance components of the test signal, read out from the memory 211, replace any chrominance data for the selected line that formerly was part of the input video signal. At the end of the chrominance data for the selected line, the microprocessor 209 restores the switch 203 to its normal state, and reconnects the input of the combiner 215 to the output of the splitter 201.

Although it is preferred that the test signal be added to the component video signal provided by the telecine machine 11, in systems in which the test signal according to the invention has been tested, the test signal has been added to the composite video signal provided by the NTSC encoder 21. The test signal has been added to the video signal at this point in the distribution system because normal, commercially-available test equipment can be used to add the test signal to a composite video signal. The inventors are unaware of any commercially-available test equipment capable of adding a vertical interval test signal to a component video signal.

The test signal shown in FIG. 2 was generated and added to the selected line, actually line 19, of a composite video signal by a model TSG 1000 programmable test generator under the control of a personal computer. The TSG 1000 programmable test generator is made by Tektronix, Inc. A floppy disc on which the programming parameters were stored was sent to Tektronix, Inc., which transferred the programming parameters into Programmable Read-Only Memories in a format suitable for programming a model 1910 test signal generator. The model 1910 test signal generator is also made by Tektronix, Inc, and being simpler and less costly than the TSG-1000, is more suitable for production use.

The output of the NTSC encoder 21 is connected to the input of the model 1910 test signal generator 141, programmed to generate the test signal according to the invention. The output of the model 1910 test signal generator is connected to the input of the composite video tape recorder 23. The signal recorded by the composite video tape recorder 23 includes the test signal on the selected line of its vertical interval. Thus, the test signal is included in all tapes recorded on the composite recorder 23, and on all tapes and other video media derived directly or indirectly from tapes recorded on the composite video tape recorder 23.

The output of each playback apparatus, e.g., 29, 53, 59, 69, 73, 75 and 77 in the distribution system is fed to an output port, e.g., 127, 129, 131, 133, 135, 137, and 139 to which a composite test signal tester, e.g., the tester 125, can be connected. Alternatively. a composite signal tester can be left connected to the port on each playback apparatus. Ports for connecting a composite test signal tester can also be provided at other points in the distribution system, if desired. The test signal can be tested at any point in the distribution system where the video signal is processed, by reproducing, recording, copying, transmitting, receiving, etc.

The composite test signal tester 125 is preferably a model VM 700 measurement system, made by Tektronix, Inc. The controls on the tester are set to make two sets of measurements: a set of luminance levels, and a set of chrominance amplitude and phase measurements, one amplitude and phase measurement for each luminance level. The measurements are shown as data on a screen. At present, a technician analyses a print-out of the measurements to determine which measurements, if any, are out of limits.

The VM 700 measurement system may be programmed to perform the tests automatically, and may be programmed with the expected result of each test, and allowable test limits. The measurement system can then be programmed to show the deviation of each measurement from normal, and to highlight those deviations that are outside the allowed test limits.

Since the composite test signal tester 125 is at present relatively expensive, it is envisaged that the tester will be moved from machine to machine within each facility. Alternatively, the tester 125 can be installed at a central location in each facility, and the output ports of all the machines in the facility can be connected to a selector, the output of which is connected to the tester. It is anticipated that lower cost testers will become available, and that each machine in the distribution system will be equipped with a tester providing continuous monitoring of the test signal.

If testing indicates that a tested parameter is out of limits, a diagnostic tape having the test signal recorded thereon can determine whether it is the tape or the machine that is out of limits. If it is the machine, repairs or adjustments can be carried out or a replacement machine used. If the machine has provision for adjusting luminance linearity and/or differential gain and phase, the test signal, monitored by a composite signal tester 125, can be use to assist in making the appropriate adjustment to correct the out-of-limit parameter.

If the cause of a tested parameter being out of limits is the tape, the tape is rejected, and the cause of the errors on the tape, e.g., errors on the machine on which the tape was recorded, is determined and repaired before a replacement tape is made.

Distribution tapes, such as tapes 43, 45, 47, 49, and 51, that are made for shipping to remote locations, such as the production facilities 57 and 65, should be tested in the mastering facility 10 before they are shipped.

The test signal according to the invention, and the testing method according to the invention, ensure that the picture fidelity of the distribution tapes 43, 45, 47, 49, and 51 is within predetermined limits of that of the master video tapes 15 and 17. It is also intended that the test signal also be used in the production facility to determine the picture fidelity of the home video media, such as video tapes and video discs, produced from the distribution tapes.

Accordingly, video cassette manufacturing facilities, such as the video cassette manufacturing facility 65, will be equipped with at least one composite test signal tester, such as the tester 125, and that the tester be used to measure the test signal on incoming distribution tapes, such as the distribution tape 49. The manufacturing facility makes working tapes, such as the working tape 67, from the distribution tapes. The duplication facility will also use the tester 125 to test the test signal on each working tape to ensure that the video signal recorded on the working tape has acceptable fidelity.

Finally, after production video cassettes 76 have been made by copying a working tape on the duplication slaves 74, the test signal transferred to the video cassettes will be tested by playing the video cassettes on the quality control video cassette player 77. A composite test signal tester 125 will be connected to the output of the video cassette player 77 for this purpose. Testing will be organized so that a sample cassette is regularly taken from each duplication slave in the facility and tested so that faulty slaves can be identified and corrected. The test signal and tester can also be used to test the video distribution system 72 in the video cassette manufacturing facility 65.

Video discs offer the best picture and sound quality of any existing home video media, but are particularly prone to the non-linear errors tested by the test signal according to the invention. Video disc manufacturing facilities, such as the video disc manufacturing facility 65, will be equipped with at least one composite test signal tester, such as the tester 125. The tester 125 will be used to measure the test signal on incoming distribution tapes, such as the distribution tape 51.

Video disc masters, such as the video disc master 63, are cut from the distribution tape, during which process the test signal is transferred to the video disc master. The test signal on test pressings made from a stamper, such as the stamper 64 made from the video disc master 63, will be tested so that defective masters can be identified before a stamper derived from a defective master is used for mass producing video discs.

The test signal on production video discs, such as the video discs 68, will be measured as part of a quality control process by playing sample production video discs on the video disc player 75 to which the composite test signal tester 125 is connected.

Figure 6:
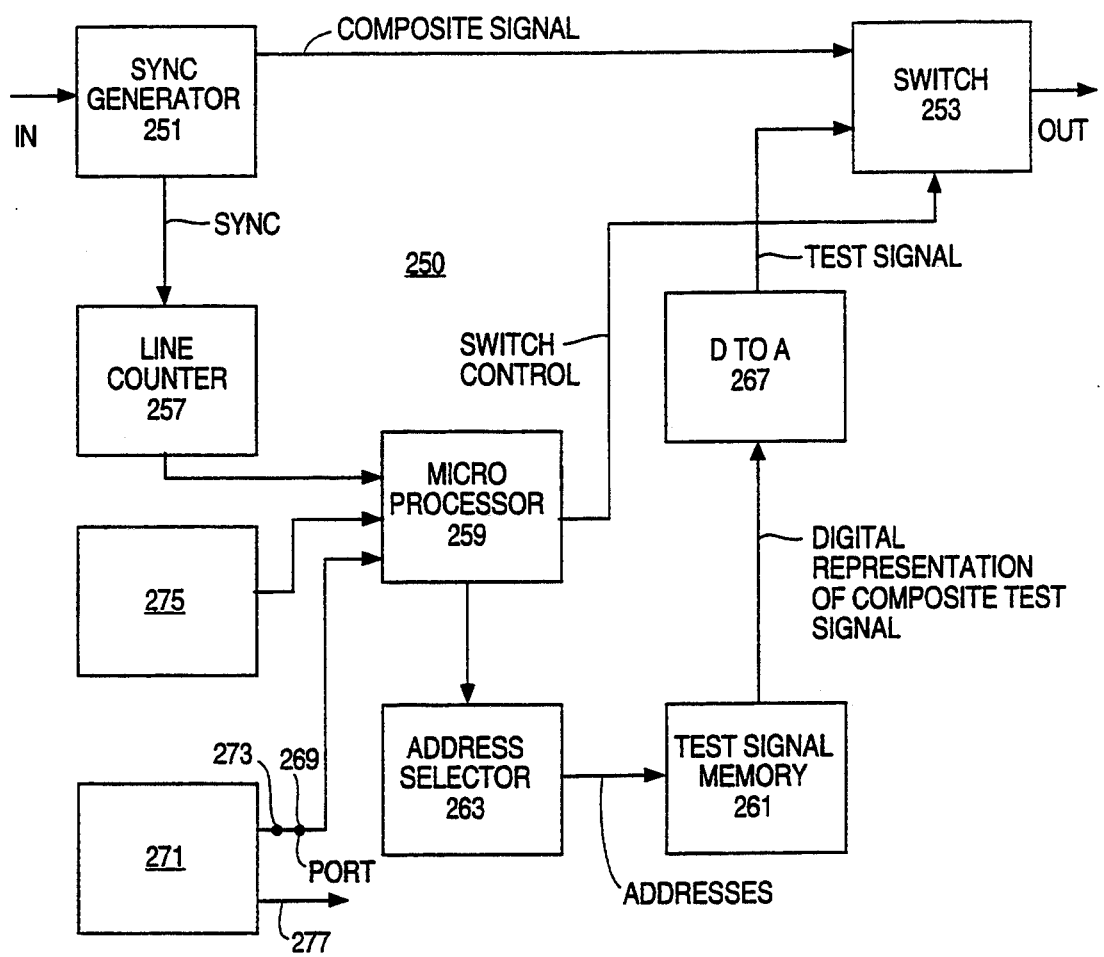
FIG. 6 is a block diagram of a composite test signal insertion unit for inserting a test signal according to the invention into the composite output signal of the NTSC encoder.

FIG. 6 is a block diagram of a composite test signal insertion unit. In FIG. 6, the composite video signal, preferably from the NTSC encoder 21 (FIG. 1), is fed into the sync generator 251. The sync generator generates line and frame synchronizing waveforms in response to the sync pulses in the video input signal. The video input signal passes to the switch 253. The synchronizing waveforms pass to the line counter 257. The output of the line counter 257 is fed into the microprocessor 259, which also receives, via the port 269, control data for use in connection with the master identification number aspect of the invention to be described below. Digital representations of the composite video test signal are stored in the memory 261, and are read out of the memory under the control of the microprocessor 259 via the address selector 263. The digital representation of the test signal stored in the memory 261 is converted into an analog composite video signal by the digital-to-analog converter 267, the output of which is connected to a second input terminal of the switch 253.

The switch 253 normally connects the composite video signal from the sync generator 25 1 to the output terminal 265. In response to the line counter, the microprocessor determines the start of the selected line and changes the state of the switch 253 so that the memory 261 is connected to the output terminal 265 via the digital-to-analog converter 267. The microprocessor also causes the address selector 263 to read the digital representation of the test signal from the memory 261 into the digital-to-analog converter 267. The resulting analog composite video test signal passes via the switch 263 to the output terminal 265. The analog composite video test signal from the digital-to-analog converter 267 replaces any video signal for the selected line that was part of the input video signal. At the end of the selected line, the microprocessor 259 restores the switch 253 to its normal state, and reconnects the output terminal to the output of the sync generator 251.

The circuit shown in FIG. 6 may also be realized in digital form to operate with a parallel D2-format digital video input signal. In a digital version of the circuit, the digital-to-analog converter 267 would be omitted.

Applications of the test signal according to the invention so far described ensure that the luminance linearity, and chrominance differential gain and phase of video signals throughout the distribution system for motion pictures on home video media fall within predetermined limits. If a video signal in which the test signal is out of limits is detected, the tape on which the out-of-limits test signal is recorded is rejected, and/or further use of the machine causing the test signal to go out of limits is prohibited until the machine is repaired. The need to re-record a tape when the test signal measures out of limits reduces the efficiency of the production process. Moreover, the picture fidelity resulting from a tape in which all the tolerances are close to the allowable limits may leave much to be desired.

The test signal according to the invention can be used to determine the errors in luminance linearity and chrominance differential gain and phase, and a correction function can be determined from the errors. The correction function can then be used to correct the errors in the video signal and the test signal. Error correction in response to the test signal may be applied at various points in the distribution system shown in FIG. 1. Error correction in response to the test signal may additionally or alternatively be applied in the consumer's video system.

Figure 7:
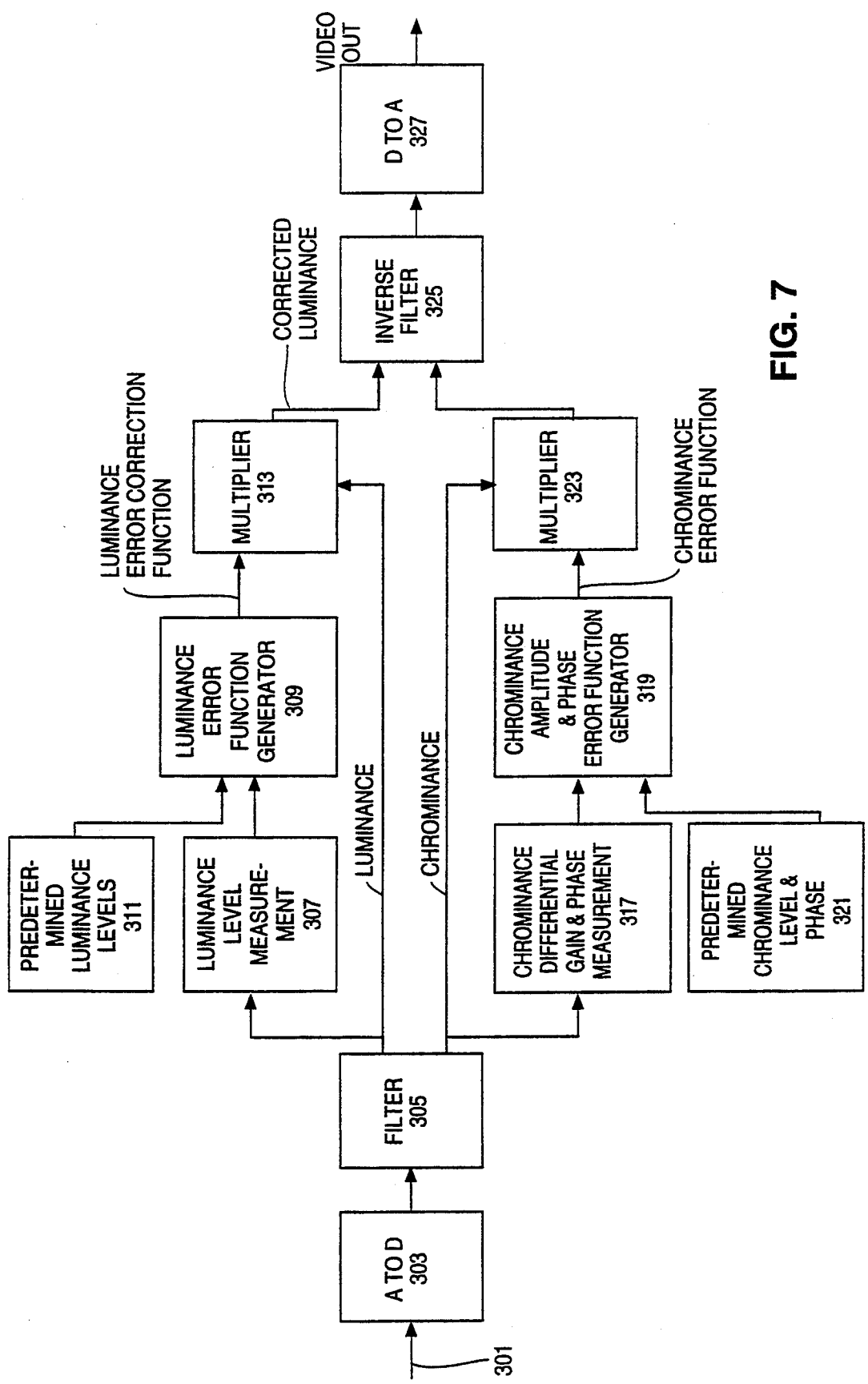
FIG. 7 is a block diagram showing a circuit, responsive to the test signal according to the invention, for correcting errors in the video signal indicated by the test signal.

A block diagram of a possible error correction system using the test signal according to the invention is shown in FIG. 7. The error correction system is shown in a digital implementation since a digital implementation appears most feasible. Analog circuits could be used for all or part of the error correction system, however. The error correction system could be implemented in a consumer digital video processing system by adding additional program steps to existing digital hardware.

In FIG. 7, the video input signal, if it is not already a digital signal, is converted into a digital video signal by the analog-to-digital converter 303. The filter 305 divides the digital video signal into luminance and chrominance components.

The block 307 extracts the luminance component of the test signal from the selected line of the vertical interval and measures the level of each step of the test signal. The luminance error function generator 309 compares each resulting level measurement with the predetermined luminance level for that step to generate a luminance error for that step. The predetermined luminance level is fed into the luminance error function generator from a look-up table in the memory 311. In response to the luminance errors for all ten steps in the test signal, the luminance error function generator 309 derives a luminance error correction function that is fed into the multiplier 313. In the multiplier, the luminance component of the video signal, including the test signal, is multiplied by the luminance error correction function. The luminance error correction function changes the luminance linearity to correct the luminance nonlinearity.

A feedback arrangement could be used as an alternative to the feed forward system shown.

The block 317 extracts the chrominance component of the test signal from the selected line in the vertical interval and measures the amplitude and phase of the chrominance component for each luminance step of the test signal. The chrominance error function generator 319 compares each resulting pair of amplitude and phase measurements with the predetermined chrominance amplitude and phase of the test signal, and generates a chrominance amplitude error and a chrominance phase error. The predetermined chrominance amplitude and phase is stored in the memory 321, which may be part of the memory 311. In response to the chrominance amplitude errors and the chrominance phase errors for all ten luminance steps in the test signal, the chrominance error correction function generator 319 derives a chrominance error correction function that is fed into the multiplier 323. In the multiplier, the chrominance component of the video signal, including the test signal, is multiplied by the chrominance error correction function to correct the differential gain and phase errors. The chrominance error correction function changes the differential gain and phase to correct the differential gain and phase errors.

A feedback arrangement could be used as an alternative to the feed forward system shown.

The corrected chrominance and luminance components of the video signal are recombined in the inverse filter 325, and the resulting digital composite video signal is converted to an analog composite video signal, if necessary, by the digital to analog converter 327. An S-video luminance/chrominance output connector could also be provided receiving the outputs of the blocks 313 and 323.

A single error correction circuit in the consumer's video system could be used to correct errors accumulating throughout the home video distribution system shown in FIG. 1 and the consumer's video system. The error correction circuit shown in FIG. 7 would be included in an outboard box that would enable error correction to be added to an existing video monitor.

The error correction circuit would preferably be included in the digital video processing circuit in the consumer's video monitor. Such a circuit would be similar to that shown in FIG. 7, except the blocks 303, 305, 325, and 327 would be omitted. The monitor's luminance/chrominance decoder, such as a multiple delay line comb filter, would be substituted for the block 305. The outputs of blocks 313 and 323 would be directly connected to the monitor's RGB decoder. No composite video signal would be formed.

Since error correction circuits will not be universal at the consumer level for some time at least, it is preferable that error correction circuits also be included at points in the video distribution system shown in FIG. 1. For example, it would be preferable that an error correction circuit be included in the path between the video tape recorder 53 and the video tape recorder 55 to minimize errors in the distribution tapes distributed by the mastering facility 10.

It would also be preferable for an error correction circuit to be included in the path between the video tape recorder 69 and the video tape recorder 71 in the video cassette manufacturing facility 65. This would minimize errors in the working tapes used in video cassette manufacturing. This, in turn, would reduce errors in video cassettes made by the manufacturing facility 65. Such cassettes would provide an improved picture fidelity even for those consumers that did not have an error correction circuit in their video systems.

Errors in the video signals recorded on video cassettes could be reduced further by including an error correction circuit in each duplication slave 74 in the video cassette manufacturing facility.

Figure 8:
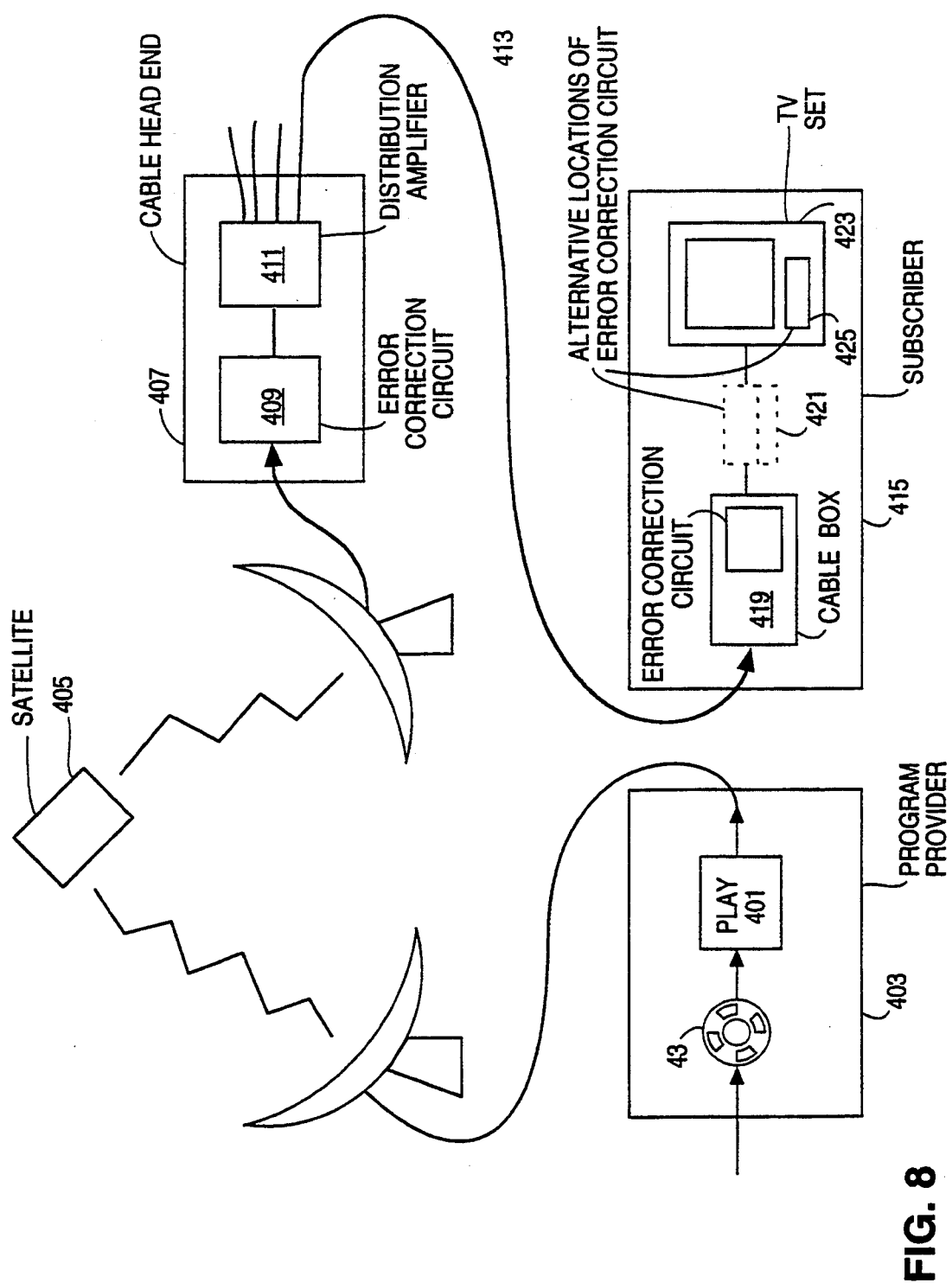
FIG. 8 is a block diagram shown application of the circuit of FIG. 7 to a typical cable distribution system.

Error correction circuits could be used in cable distribution systems to improve the picture fidelity for all subscribers. A typical cable distribution system is shown in FIG. 8. In this, the distribution tape 43, with the test signal according to the invention, is reproduced on the video tape recorder 401 at the cable program provider's facility 403. The resulting video signal, including the test signal, is distributed via satellite 405 to multiple cable system head ends, one of which is shown as 407. At the cable head end 407, an error correction circuit 409 corrects errors in the video signal received from the satellite distribution system.

The resulting error-corrected video signal then passes into the cable head end's distribution amplifiers 411, whence it is distributed by cable 413 to multiple subscribers, including the subscriber 415. Because errors in the video signal received from the satellite distribution system have been corrected by the error correction circuit 409 in the cable head end, the fidelity of the video signal received by the subscriber is improved.

Errors in the cable distribution system 413 may also be corrected by an error correction circuit in the consumer's video system. This could be the error correction circuit 417 located in the consumer's cable converter box 419, or the error correction circuit 421 in an external error correction box attached to the input of the consumer's monitor 423, or could be the error correction circuit 425, located in the consumer's video monitor 423.

The master identification number aspect of the invention will now be described. The master identification number is preferably a binary number that is added to a line in the vertical interval of the video signal recorded on a master video tape at as early a stage as possible in the video distribution process. The master identification number appears on all copies, including home video media, derived from that master video tape. The master identification number is a number that, irrespective of the tape or home video medium it appears, uniquely identifies the master video tape.

By reading the master identification number on any tape in the distribution system, or on any home video medium, and referring to a data base of master identification numbers, the master video tape from which the tape or the home video medium was derived can be determined.

The master identification number can be inserted into the video signal at the output of the telecine machine 11 (FIG. 1), or into the output of the NTSC encoder 21. The master identification number is preferably added to the video signal by the test signal insertion unit that adds the test signal according to the invention to the video signal.

The master identification number preferably includes two components, a machine identification number, and a serial number. Component video recorders, such as the component video recorder 13, and composite video recorders, such as the composite video recorder 23, in mastering facilities worldwide will each be allocated a unique machine identification number by the keeper of the data base. The master identification number on each tape produced by a given recorder will include the recorder's machine identification number. Alternatively, the master identification number may have other formats capable of uniquely identifying a master video tape.

The serial number may be allocated by the mastering facility where the recorder is located, by the keeper of the data base, or by the owner of the motion picture film being distributed in home video media.

The test signal insertion units shown in FIGS. 4 and 6 have a provision for inserting a master identification number into a second selected line of the vertical interval, different from that occupied by the test signal. Since all other lines of the vertical interval are already occupied, the master identification number is preferably located on the half line, line 21. The half line 21 can accommodate over 100 binary bits large enough to be reproduced by a VHS cassette player. A master identification number system accommodating ten thousand master recorders and one million serial numbers per recorder would only require about 34 bits. Thus, other useful information could be included in the master identification number. For example, data identifying machines that process the video signal later in the distribution system could be added to provide a more complete picture of the genealogy of a given copy. Additional data bits could be provided for various control functions, for example, for activating a surround sound decoder, for indicating the preferred aspect ratio of the display, and for indicating whether the test signal according to the invention is present, and, if so, which line it is on.

The master identification number inserting aspect of the test signal insertion unit 250 shown in FIG. 6 will now be described. The master identification number inserting aspect of the test signal insertion unit shown in FIG. 4 is similar, and so will not be described.

In FIG. 6, the control port 269 is connected to the computer 271 though an interface cable 273. Parallel or serial connection may be used. The computer 271 runs a database program, such as Paradox TM, dbase TM, etc., with data entry screens that require the data required by the keeper of the data base to be entered. In response to a complete entry of data, the data base program allocates a serial number to the entry. If the serial number is entered as part of the data entry process, the data base program checks to ensure that the entered serial number does not duplicate a serial number already issued to the machine to which the computer is connected.

After it has allocated a serial number, the computer 271 downloads the serial number to the test signal insertion unit 250 via the port 269. The microprocessor 259 translates the number represented by the ASCII characters received from the computer into a binary number and stores bytes representing the 1s and 0s of the binary number in known locations in the memory 261. The bytes representing the 1s and 0s are chosen so that they produce easily distinguished analog levels when converted to analog by the digital-to-analog converter 267.

The machine identification number of the machine to which the test signal insertion unit 250 is connected may also be stored in the computer 271, and be downloaded to the test signal insertion unit 250. The microprocessor 259 would translate the machine identification number into binary and store bytes representing the binary number in known locations in the memory 261.

Alternatively, the thumb wheel switch 275 can set the machine identification number directly in the test signal insertion unit 250 to which the machine is connected. The microprocessor 259 could read and translate the machine identification number directly from the thumb wheel switch each time it needed the number, or could store bytes representing the machine identification number in binary in known locations in the memory 261. The microprocessor would also communicate the machine identification number to the computer via the port 269.

As a yet further alternative, the machine identification number could be communicated from the machine itself to an additional port (not shown) on the test signal insertion unit.

Preferably, the machine identification number and the serial number are stored in the memory 261 so that they can be read out of the memory as a unitary master identification number.

The computer 271 periodically uploads additions to its database to the keeper of the data base. This is preferably done automatically, using a modem and the telephone line 277. The computer can also receive new serial numbers and information on forthcoming jobs from the keeper of the database via the telephone line 277.

At the beginning of a job, for example, the job of producing the letterbox composite master from the letterbox component master, the required data is entered into the computer 271. The data may include a serial number, otherwise the database program allocates a serial number. The serial number is downloaded to the test signal insertion unit 250, where it is stored, as bytes representing a binary number, in the memory 261. The machine identification number is also stored in the memory as bytes representing a binary number.

As well as inserting the test signal on the selected line, the test signal insertion unit inserts the master identification number on the second selected line, such as line 21. The switch 253 normally connects the composite video signal from the sync generator 251 to the output terminal 265. In response to the line and pixel counter, the microprocessor determines the start of the second selected line, and changes the state of the switch 253 so that the memory 261 is connected to the output terminal 265 via the digital-to-analog converter 267. The microprocessor also causes the address selector 263 to read the bytes comprising the master identification number from the memory 261. The digital-to-analog converter 267 converts the bytes of the master identification number into a two-level analog signal which passes via the switch 263 to the output terminal 265. The analog signal from the digital-to-analog converter 267 replaces any video signal on the second selected line that was part of the input video signal. At the end of line 21, the microprocessor 259 restores the switch 253 to its normal state, and reconnects the output terminal to the output of the sync generator 251.

The circuit shown in FIG. 6 may also be realized in digital form to operate with a parallel D2-format digital video input signal. In a digital version of the circuit, the digital to analog converter 267 would be omitted.

We claim:

1. A test signal for use in detecting errors in low-level luminance linearity in a distribution system for distributing a video signal having a vertical interval including a number of lines, the test signal comprising:
   plural luminance levels, the luminance levels having a non-linear level relationship with respect to one another, each luminance level having a predetermined level, more than two of the luminance levels being at a luminance level below 20 IRE units;
   the test signal being adapted for insertion into a line in the vertical interval of the video signal at an insertion point in the distribution system for testing at a point downstream of the insertion point.

2. The test signal of claim 1, wherein
   the video signal additionally includes a chrominance component and a color reference burst, and
   the test signal is additionally for use in detecting errors in flesh tones, and additionally comprises a chrominance component, the chrominance component having a predetermined amplitude, and a predetermined phase, the phase corresponding to flesh tone.

3. The test signal of claims 2, wherein, at each luminance level, the chrominance component has an amplitude of about 40 IRE units and a phase of about 300 degrees relative to the color reference burst.

4. The test signal of claims 1 or 2, wherein the plural luminance levels are arranged in order of increasing level.

5. The test signal of claims 1 or 2, wherein the plural luminance levels include levels of about 7.5, 10, 12.5, and 20 IRE unit.

6. The test signal of claim 5, wherein:
   the test signal is additionally for use in detecting errors in high-level luminance linearity;
   the luminance levels have a first spacing at middle luminance levels,
   the luminance levels have a second spacing at high luminance levels, and
   the first spacing is greater than the second spacing.

7. The test signal of claims 1 or 2, additionally comprising a sin x/x section, a 2 T pulse section and a modulated 20 T pulse section.

8. A method for detecting low-level luminance errors in a distribution system for distributing a video signal having a vertical interval including a number of lines, the distribution system having a source stage and a later stage, the method comprising the steps of, at the source stage:
   providing a test signal including plural luminance levels, the luminance levels having a non-linear level relationship with respect to one another, each luminance level having a predetermined level, more than two of the luminance levels being at a luminance level below 20 IRE units; and
   inserting the test signal into at least part of a selected line in the vertical interval of the video signal.

9. The method of claim 8, wherein the method additionally comprises the steps of, at the later stage:
   measuring at least two of the luminance levels in the test signal;
   comparing each of the at least two measured luminance levels with its corresponding predetermined luminance level to provide at least two luminance errors; and
   changing luminance linearity in one of the source stage and the later stage to correct the luminance errors.

10. The method of claim 9, wherein:
    the video signal additionally includes a chrominance component,
    the method is additionally for detecting errors in flesh tones, and
    in the step of providing a test signal, each luminance level includes a chrominance component, the chrominance component having a predetermined amplitude, and a predetermined phase, the phase corresponding to flesh tone, and
    the method additionally comprises the steps of:
    measuring the amplitude and phase of the chrominance component of at least two luminance levels in the test signal,
    comparing each measured amplitude and each measured phase of the chrominance component with the predetermined amplitude and phase of the chrominance component with the predetermined amplitude and phase of the chrominance component to provide at least two chrominance gain errors and at least two chrominance phase errors; and changing differential chrominance gain and differential chrominance phase in one of the source stage and the later stage to correct the chrominance gain errors and the chrominance phase errors.

11. The method of claim 10, wherein, in the later stage of the distribution system, automatic circuitry performs the steps of:

measuring at least two of the luminance levels in the test signal, comparing each of the at least two measured luminance levels with its corresponding predetermined luminance level to provide at least two luminance errors, changing luminance linearity in one of the source stage and the later stage to correct the luminance errors, measuring the amplitude and the phase of the chrominance component of at least two luminance levels in the test signal, comparing each measured amplitude and each measured phase of the chrominance component with the predetermined amplitude and phase of the chrominance component to provide at least two chrominance gain errors and at least two chrominance phase errors, and changing differential chrominance gain and differential chrominance phase in one of the source stage and the later stage to correct the chrominance gain errors and the chrominance phase errors.

12. The method of claim 9, wherein, in the later stage of the distribution system, automatic circuitry performs the steps of:

measuring at least two of the luminance levels in the test signal, comparing each of the at least two measured luminance levels with its corresponding predetermined luminance level to provide at least two luminance errors, and changing luminance linearity in one of the source stage and the later stage to correct the luminance errors.

13. The method of claim 9, wherein:

the video signal additionally includes a chrominance component, the method is additionally for detecting errors in flesh tones, and in the step of providing a test signal, each luminance level includes a chrominance component, the chrominance component having predetermined amplitude, and a predetermined phase, the phase corresponding to flesh tone.

14. The method of claim 8, wherein the method additionally comprises the steps of, at the later stage:

processing the video signal to provide a processed video signal having a vertical interval including the test signal;

measuring at least two of the luminance levels in the test signal in the processed video signal;

comparing each of the at least two measured luminance levels with its corresponding predetermined luminance level to provide at least two luminance errors; and repeating the step of processing the video signal when the luminance errors are outside a predetermined tolerance.

15. The method of claim 14, wherein:

the video signal additional includes a chrominance component including a color reference burst, the method is additionally for detecting errors in flesh tones, in the step of providing a test signal, each luminance level includes a chrominance component, the chrominance component having a predetermined amplitude, and a predetermined phase, the phase corresponding to flesh tone, and the method additionally comprises the steps of:

measuring the amplitude and phase of the chrominance component of at least two luminance levels in the test signal in the processed video signal;

comparing each measured amplitude and phase of the chrominance component with the predetermined amplitude and phase of the chrominance component to provide at least two chrominance gain errors and at least two chrominance phase errors; and repeating the step of processing the video signal when one of the chrominance gain errors, and the chrominance phase errors is outside a corresponding predetermined tolerance.

16. The method of claims 14, or 15, wherein the step of repeating the step of processing the video signal includes the steps of:

determining a cause of the luminance errors being outside the predetermined tolerance, and correcting the cause of the luminance errors being outside the predetermined tolerance, and before the step of processing the video signal is repeated.

17. The method of claims 10 or 15, wherein, in the step of providing a test signal, each luminance level includes a chrominance component having an amplitude of about 40 IRE units and a phase of about 300 degrees relative to the color reference burst.

18. The method of claims 8, 9, or 14, wherein, in the step of providing a test signal including plural luminance levels, the plural luminance levels are arranged in order of increasing level.

19. The method of claim 18, wherein, in the step of providing a test signal including plural luminance levels, luminance levels of about 7.5, 10, 12.5, and 20 IRE units are provided.

20. The method of claim 19, additionally for detecting errors in high-level luminance linearity, wherein in the step of providing a test signal including plural luminance levels;

the luminance levels have a first spacing at middle luminance levels, the luminance levels have a second spacing at high luminance levels, and the first spacing is greater than the second spacing.

21. The method of claim 8, 9, or 14, wherein the step of providing a test signal including plural luminance levels provides a test signal additionally comprising a sin x/x section, a 2 T pulse section and a modulated 20 T pulse section.

22. The method of claims 8, 9, or 14, additionally comprising a step of deriving the video signal from a motion picture at the source stage.

23. An apparatus for inserting a test signal for detecting errors in low-level luminance linearity into a video signal, the video signal having a vertical interval including a number of lines, and a luminance component, the apparatus comprising:
- a means for receiving the video signal;
- a means for generating a test signal including plural luminance levels, the luminance levels having a non-linear level relationship with respect to one another, each luminance level having a predetermined level, more than two of the luminance levels being at a luminance level below 20 IRE units; and
- a means for inserting the test signal into at least part of a selected line in the vertical interval of the video signal.

24. The apparatus of claim 23, wherein the means for generating a test signal generates a test signal additionally for detecting errors in flesh tones, and is additionally for adding a chrominance component to each luminance level, the chrominance component having predetermined amplitude, and a predetermined phase, the phase corresponding to flesh tone.

25. The apparatus of claims 23 or 24, wherein the means for generating a test signal generates a test signal including plural luminance levels arranged in order of increasing level.

26. The apparatus of claim 25, wherein the means for generating a test signal generates a tests signal including luminance levels of about 7.5, 10, 12.5, and 20 IRE units.

27. The apparatus of claim 25, wherein, the means for generating a test signal generates a test signal additionally for detecting errors in high-level luminance linearity, and having:
- the luminance levels with a first spacing at middle luminance levels, and
- the luminance levels with a second spacing at high luminance levels, the first spacing being greater than the second spacing.

28. The apparatus of claim 24, wherein:
- the video signal includes a color reference burst, and
- the means for generating a test signal adds to each luminance level a chrominance component having an amplitude of about 40 IRE units and a phase of about 300 degrees relative to the color reference burst.

29. The apparatus of claims 23 or 24, wherein the means for generating a test signal including plural luminance levels generates a test signal additionally comprising a sin x/x section, a 2 T pulse section and a modulated 20 T pulse section.

30. The apparatus of claim 23, wherein:
- the means for generating a test signal includes:
  - a memory means for storing a digital representation of the test signal,
  - a means for reading the digital representation of the test signal out of the memory means, and
  - a deriving means for deriving the test signal from the digital representation of the test signal read out of the memory means; and
- the means for inserting the test signal into at least part of a selected line in the vertical interval of the video signal includes:
  - a means for providing a control signal indicating the selected line,
  - a switching means for selecting one of the video signal and the test signal in response to the control signal, the test signal being selected when the control signal indicates the selected line.

31. An apparatus for correcting low-level luminance errors in a video signal having on at least part of a selected line in the vertical interval thereof a test signal including plural luminance levels, the luminance levels having a non-linear level relationship with respect to one another, each luminance level having a predetermined level, more than two of the luminance levels being at a luminance level below 20 IRE units; the apparatus comprising:
- a means for measuring at least two of the luminance levels in the test signal;
- a first comparing means for comparing each of the at least two measured luminance levels with its corresponding predetermined luminance level to provide at least two luminance errors; and
- a means, responsive to the luminance errors, for changing luminance linearity of the video signal to correct the luminance errors.

32. The apparatus of claim 31, wherein:
- the means for measuring at least two of the luminance levels in the test signal includes a means for providing a digital representation of each measured luminance level, and
- the first comparing means includes:
  - a means for storing a digital representation of each predetermined luminance level,
  - means for providing a difference between the digital representation of a measured luminance level and the digital representation of its corresponding predetermined luminance level as a luminance error.

33. The apparatus of claim 31, wherein:
- each luminance level of the test signal includes a chrominance component, the chrominance component having predetermined amplitude, and a predetermined phase, the phase corresponding to flesh tone,
- the apparatus is additionally for correcting errors in flesh tones, and
- the apparatus additionally comprises:
  - a means for measuring the amplitude and the phase of the chrominance component of at least two luminance levels in the test signal;
  - a second comparing means for comparing each measured amplitude and phase of the chrominance component with the predetermined amplitude and the predetermined phase of the chrominance component to provide at least two chrominance gain errors and at least two chrominance phase errors; and
  - a means, responsive to the chrominance gain errors and the chrominance phase errors, for changing differential chrominance gain and differential chrominance phase of the video signal to correct the chrominance gain errors and the chrominance phase errors.

34. The apparatus of claim 33, wherein:
- the means for measuring the amplitude and phase of the chrominance component of at least two luminance levels includes a means for providing a digital representation of the amplitude and phase of the chrominance component of the at least two luminance levels,
- the second comparing means includes:
  - a means for providing a digital representation of each measured amplitude and phase of the chrominance component,
  - a means for storing a digital representation of the predetermined amplitude and phase of the chrominance component, and a means for providing a difference between the digital representation of each measured amplitude and phase of the chrominance component and the digital representation of the predetermined amplitude and phase of the chrominance component as each chrominance gain error and each chrominance phase error.

* * * * *